United States Patent Office 3,323,867
Patented June 6, 1967

3,323,867
PREPARATION OF DIBORANE
Richard K. Pearson, Mars, Pa., assignor to Callery Chemical Company, Pittsburgh, Pa., a corporation of Pennsylvania
No Drawing. Filed July 1, 1957, Ser. No. 668,922
11 Claims. (Cl. 23—204)

This invention relates to the preparation of boron compounds and more particularly to a novel method for the preparation of dihaloboranes, $BHX_2$, and diborane.

Diborane has been the subject of considerable investigation since Stock began his pioneer work in 1912. It has been used in processes to deposit boron coatings on metals, to prepare other useful boranes, e.g., pentaborane-9 and decaborane, as well as to prepare numerous other useful boron compounds such as borohydrides. As diborane became more familiar and useful there arose much interest in finding methods of preparing it that were more efficient and less expensive than the pyrolysis of $B_4H_{10}$ as used by Stock. Schlesinger and Brown, Chem. Rev. 31, 1, reported a method of preparing diborane that consisted of contacting hydrogen and boron trichloride, $BCl_3$, in an eletcric discharge to form the intermediate monochlorodiborane, $B_2H_5Cl$, which was disproportionated to diborane and boron trichloride. Even by this method, however, the cost of diborane is excessive because of the high power consumption of the electric arc and the requirement of subatmospheric pressures. Other subsequently developed methods for the preparation of diborane require that the hydridic hydrogen be supplied by metal hydrides or borohydrides, e.g., the reaction of lithium borohydride, $LiBH_4$ with boron trifluoride or the reaction diborane from hydrogen and boron trihalide that is com- of sodium hydride, $NaH$, with boron trifluoride.

It is an object of this invention to provide a method of preparing diborane that does not require the use of a metal hydride or borohydride. A further object of this invention is to provide a comparatively inexpensive method of preparing a dihaloborane. A more specific object of this invention is to provide a method of preparing diborane from hydrogen and boron trihalide that is comparatively inexpensive, easily performed, and provides suitable yields of diborane.

This invention is based on the discovery that hydrogen reacts with boron trichloride or boron tribromide at temperatures from about 550° C. to 950° C. to form dihaloborane, $BHX_2$, according to

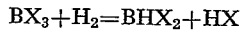

where X is chloride or bromide, and the discovery that the reaction mixtures containing the dihaloboranes are sufficiently stable at reaction temperatures to permit recovery of the dihaloborane.

Compounds having boron hydrogen bonds (i.e. hydridic hydrogen) are generally subject to thermal dissociation or pyrolysis reactions which destroy the boron-hydrogen bond. Fluid compounds containing boron-hydrogen bonds, such as diborane and tetraborane, generally undergo such reactions at very moderate temperatures, e.g., 100 to 200° C. I have found that dihaloboranes produced by the reaction of hydrogen and a boron trihalide are relatively stable in the reaction mixture even at the extremely high temperatures required for the occurrence of a reaction. The gaseous reaction mixture is believed to be an equilibrium mixture; it contains hydrogen, boron trihalide, hydrogen halide and the dihaloborane. The rate of formation of the dihaloborane is quite rapid, and since it is consumed by pyrolytic reactions relatively slowly, it is possible to form the dihaloborane and remove it from the reaction zone in good yields. The pyrolytic side reactions produce undesired solid materials.

Hydrogen and hydrogen halide can be separated from the reaction product mixture by fractional condensation, i.e., the boron trihalide and dihaloborane are condensed from the mixture and separated from the gaseous hydrogen and hydrogen halide. The hydrogen halide and hydrogen are easily separated by a number of conventional methods such as fractional condensation or preferential absorption of the hydrogen halide. If preferred the hydrogen may first be separated from the reaction mixture by fractional condensation, and the hydrogen halide then distilled from the liquid boron trihalide-dihaloborane-hydrogen halide mixture by low temperature distillation.

The residual condensate, after the separation of hydrogen and hydrogen halide, is a mixture of boron trihalide and dihaloborane. The dihaloboranes disproportionate according to the equilibrium reaction

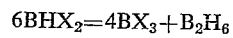

where X is chloride or bromide. Thus, there will be a formation of some diborane by the disproportionation reaction in the recovered condensate; however, when the boron trihalide concentration is high the rate at which diborane is formed is extremely slow and the equilibrium diborane concentration is very low. In order to obtain essentially quantitative yields of diborane from the dihaloboranes at a relatively fast rate it is necessary to reduce the boron trihalide concentration in the liquid condensate, i.e., remove some boron trihalide from the mixture. Since the dihaloborane is more volatile than the boron trihalide this can conveniently be done by distillation methods.

For example, the liquid mixture may be distilled to give a distillate rich in dihaloborane which is collected and disproportionated in a receiver, which may be warmed to increase the rate of disproportionation. It is particularly convenient to carry out the separation of the boron trihalide and the disproportionation of the dihaloborane simultaneously. To illustrate, if the mixture is fractionated at total reflux a composition gradient is set up over the length of the fractionating column, with increasing dihaloborane concentration at increasingly higher positions on the column. At these higher dihaloborane concentrations the diproportionation reaction proceeds readily yielding diborane which is removed as a non-condensible gas from the column. The boron trihalide which is generated by the disproportionation reaction is continually separated by the concurrent distillation and is recovered or removed from the pot or bottom plate of the column. This simultaneous distillation-disproportionation operation may be carried out at superatmospheric pressures which permit operation at higher temperatures, and hence result in a more rapid disproportionation. At high pressures, that is above about 150 p.s.i.g., the increase in reaction rate caused by the higher operating temperature is counter balanced by the solubility of diborane in the mixture and by mass action effect which tend to decrease the reaction rate.

The reaction of hydrogen and a boron trihalide to produce dihaloborane proceeds when the reactants are contacted at temperatures above about 550° C. To illustrate, in one reaction measured streams of hydrogen and boron trichloride were mixed and passed through a tube packed with helices which was heated by a muffle furnace to 830° C. The temperature in this and other reactions was detected by a shield thermocouple located in the center of the heated reaction zone, and was measured by a null balance potentiometer. The mixed feed contained 25 moles of hydrogen for each mole of boron trichloride. The reaction pressure was 812 mm. of Hg. and the nominal residence time in the hot zone was 15 seconds. The effluent gases from the reactor were sampled for mass spectrum analysis and the remainder of the gas was passed through traps maintained at −196° C. which passed the hydrogen and retained all the hydrogen chloride, boron trichloride and dichloroborane. The collected material was analyzed to determine the boron, chlorine, and hydridic hydrogen content. From these analyses, proportions of hydrogen chloride, dichloroborane and boron trichloride were calculated. The per pass yield of dichloroborane, i.e. the percent of boron trichloride fed converted to dichloroborane, was determined to be 26.5% by the chemical analysis and 28.2% by mass spectrum analysis. In other reactions the material collected in the −196° trap was distilled through a −142° trap which passed the hydrogen chloride, but did not pass the boron trichloride or dichloroborane. The boron trihalide-dichloroborane mixture was disproportionated and it was determined that essentially quantitative yields of diborane may be recovered from such mixtures.

From about 550° C. to about 850° C. the proportion of boron trihalide converted to dihaloborane increases with increasing temperature; above about 850° C., however, the proportion converted to dihaloborane decreases with increasing temperature because of loss to pyrolytic reactions. Suitable amounts of the dihaloboranes may be recovered from reactions at a temperature from about 550° C. to about 950° C., with temperatures of about 750° to 850° C. preferred when using $BCl_3$ and 650–850° C. preferred when using $BBr_3$.

Increasing the proportion of hydrogen in the feed mixture increases the per pass yield; however, very high proportions of hydrogen decrease the ultimate yield (ultimate yield=$HBX_2$ produced/$BX_3$ consumed×100). Thus in reactions at a temperature of 830° C., a pressure of 812 mm. of Hg, and a nominal residence time of 15 seconds, when the mole ratio of hydrogen to boron trichloride in the feed was 9 to 1, the per pass yield was 19.5% and the ultimate yield was 36.6%. At the same reaction conditions when the mole ratio of hydrogen to boron trichloride in the feed was 40 to 1 the per pass yield was 25% and the ultimate yield was 28%. The desirable effect of the excess hydrogen in increasing the per pass yield can be obtained while minimizing the undesirable effect of decreasing ultimate yield by decreasing the contact time in the reactor. This is illustrated by the results contained in Table I for reactions at 812 mm. of pressure, 830° C., and a nominal residence time of only 5 seconds. The nominal residence time was calculated from the volume flow rate of the gas at reaction temperature and the reactor volume. The actual contact time of the reactants at reaction temperature is about 40–80% of the nominal residence time since the feed gases were not preheated and the time required to heat the feed to reaction temperature is included in the nominal residence time.

TABLE I.—PREPARATION OF $BHCl_2$

| Mol Ratio $H_2$ to $BCl_3$ In Feed Mixture | Per Pass Yield of $BHCl_2$ | Ultimate Yield of $BHCl_2$ |
| --- | --- | --- |
| 8.5/1 | 20 | 67 |
| 23/1 | 25.5 | 61 |
| 51/1 | 38 | 58 |

Temperature equals 830° C.
Pressure equals 812 mm. Hg.
Residence time equals 5 seconds.

It is preferred to use a feed mixture containing between about 5 and 25 moles of hydrogen to each mole of boron trihalide, and other mixtures containing from 1 to over 100 moles of hydrogen to each mole of boron trihalide may be used.

At any selected hydrogen to boron trihalide ratio and temperature, the per pass yield of dihaloborane is about the same over a wide range of residence times. Thus from reactions with a hydrogen to $BCl_3$ ratio of 8–8.5 to 1 and a temperature of 830° C. and a nominal residence time of 5, 9, 15, 18 and 27 seconds, the per pass yield was respectively 20%, 21.6%, 19.5%, 20.1% and 20%. However, with increasing residence time the ultimate yield decreases: with 5 seconds residence time the ultimate yield was 67% and with 15 seconds residence time the ultimate yield was 36.6%. It is preferred to use residence time from about 3 to 15 seconds, although suitable per pass yields of dihaloboranes have been recovered from reactions at residence times up to 15 minutes.

The reaction may be carried out at subatmospheric or superatmospheric pressure. For example, the yields were about the same from reactions run at 700 millimeters pressure, 812 millimeters pressure, and 2 atmospheres pressure. It is preferred to operate at pressure slightly above atmospheric pressure to eliminate the danger of air leaking into the reactor and forming an explosive mixture with the hydrogen.

Boron tribromide reacts with hydrogen in the same manner as boron trichloride. For example, hydrogen was passed through liquid boron tribromide to give a feed mixture containing 11.6 moles of hydrogen to each mole of boron tribromide. This mixture passed through a vycor tube heated by a muffle furnace to 750° C. The per pass yield of dibromoborane was 44.6%, and the ultimate yield was 84%. The reaction of boron tribromide proceeds more readily at somewhat lower temperatures than reaction of boron trichloride, and temperatures from about 650° C. to 850° C. are preferred. The dibromoborane and boron tribromide are separated from hydrogen and hydrogen bromide in the same manner as previously described. Since the boron tribromide and dibromoborane are higher boiling than the corresponding chloride compounds the separation may be accomplished without the use of low temperature condensers.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. In a method of preparing a dihaloborane, $BHX_2$, the step which consists of heating and reacting hydrogen, $H_2$, and a boron trihalide, $BX_3$, where X is selected from chloride and bromide, at a temperature from about 550° C. to about 950° C. for a period of time less than about fifteen minutes, using between about 1 and 100 mol of hydrogen for each mol of boron trihalide, and recovering the dihaloborane produced.

2. A method according to claim 1 in which the boron trihalide is $BCl_3$ and the temperature is between about 750° and 850° C.

3. A method according to claim 1 in which the boron trihalide is $BBr_3$ and the temperature is between about 650–850° C.

4. A method according to claim 1 in which the mole ratio of hydrogen to boron trihalide is between about 5:1 and 25:1.

5. A method according to claim 1 in which the reactants are maintained at reaction temperature for a period of from about 2 to 15 seconds.

6. In a method of preparing a dihaloborane, $BHX_2$, the step which consists of heating and reacting hydrogen, $H_2$, and a boron trihalide, $BX_3$, where X is selected from chloride and bromide, at a temperature from about 750 to 850° C. for a period of from about three to fifteen seconds, using between about 5 and 25 mols of hydrogen for each mol of boron trihalide, and recovering the dihaloborane produced.

7. In a method of preparing diborane the steps which consist of heating and reacting hydrogen, $H_2$, and a boron trihalide, $BX_3$, where X is selected from chloride and bromide, at a temperature from about 550 to 950° C. for a period less than about fifteen minutes, using between about 1 and 100 mols of hydrogen for each mol of boron halide, recovering a mixture of dihaloborane and boron trihalide formed thereby, disproportionating the said mixture to form diborane and boron trihalide, and separately recovering the diborane and boron trihalide formed.

8. A method according to claim 7 in which the boron trihalide is $BCl_3$ and the temperature is between about 750° and 850° C.

9. A method according to claim 7 in which the boron trihalide is $BBr_3$ and the temperature is between about 650–850° C.

10. A method according to claim 7 in which the mole ratio of hydrogen to boron trihalide is between about 5:1 and 25:1.

11. A method according to claim 7 in which the reactants are maintained at reaction temperature for a period of from about 3 to 15 seconds.

References Cited

UNITED STATES PATENTS

| | | | |
|---|---|---|---|
| 2,469,879 | 5/1949 | Hurd | 23—204 |
| 2,596,690 | 5/1952 | Hurd | 23—204 |
| 2,768,061 | 10/1956 | Cook et al. | 23—204 X |
| 2,839,367 | 6/1958 | Stern et al. | 23—209 |
| 2,875,028 | 2/1959 | Winternitz | 23—204 |
| 2,992,248 | 7/1961 | Pearson | 206—429 |

OTHER REFERENCES

Hurd (3), "J. Amer. Chem. Soc.," vol. 71, pages 20–22, January 1949.

Mikheeva et al., "Current Literature Abstracts Bulletin," vol. 7, page 171, Item 545 (1958), Abstract cited from "Zhur Neorg Khim," vol. 2, pages 2530–2538 (1957).

Parravano Chemical Abstracts, vol. 17, Column 3651 (5) (1923).

Parravano et al.—"Chemical Abstracts," vol. 17, Column 3651 (5) (1923).

Schechter et al.—"Boron Hydrides and Related Compounds," pages 20, 37, Jan. 8, 1951 (declas. Jan. 5, 1954), Dept. of Navy, Bureau of Aeronautics, Contract No a(s) 10992, March 1951.

Schlesinger et al., "J. Amer. Chem. Soc.," vol. 53, pages 4321–4332, December 1931.

Sidgwick, "Chemical Elements and Their Compounds," 1950, vol. I, pages 15–18.

Stock et al.—"Deutsch Chemische Gesellschaft, Berichte," vol. 67 (1934), pages 396–407.

Weintraub, Industrial and Engineering Chem., vol. 3, No. 5, May 1911, pages 299–301.

Uno et al.—"Chemical Abstracts," vol. 48, Column 7375(h) (1953).

OSCAR R. VERTIZ, *Primary Examiner.*

ROGER L. CAMPBELL, WILLIAM G. WILES, LEON D. ROSDOL, MAURICE A. BRINDISI, MILTON WEISSMAN, *Examiners.*

W. A. KEMMEL, C. D. QUARFORTH, R. D. MORRIS,
*Assistant Examiners.*